Sept. 10, 1940.   L. DE BROUCKERE   2,214,720
RECORDING MEANS FOR WEIGHING MACHINES
Filed March 28, 1938   3 Sheets-Sheet 2
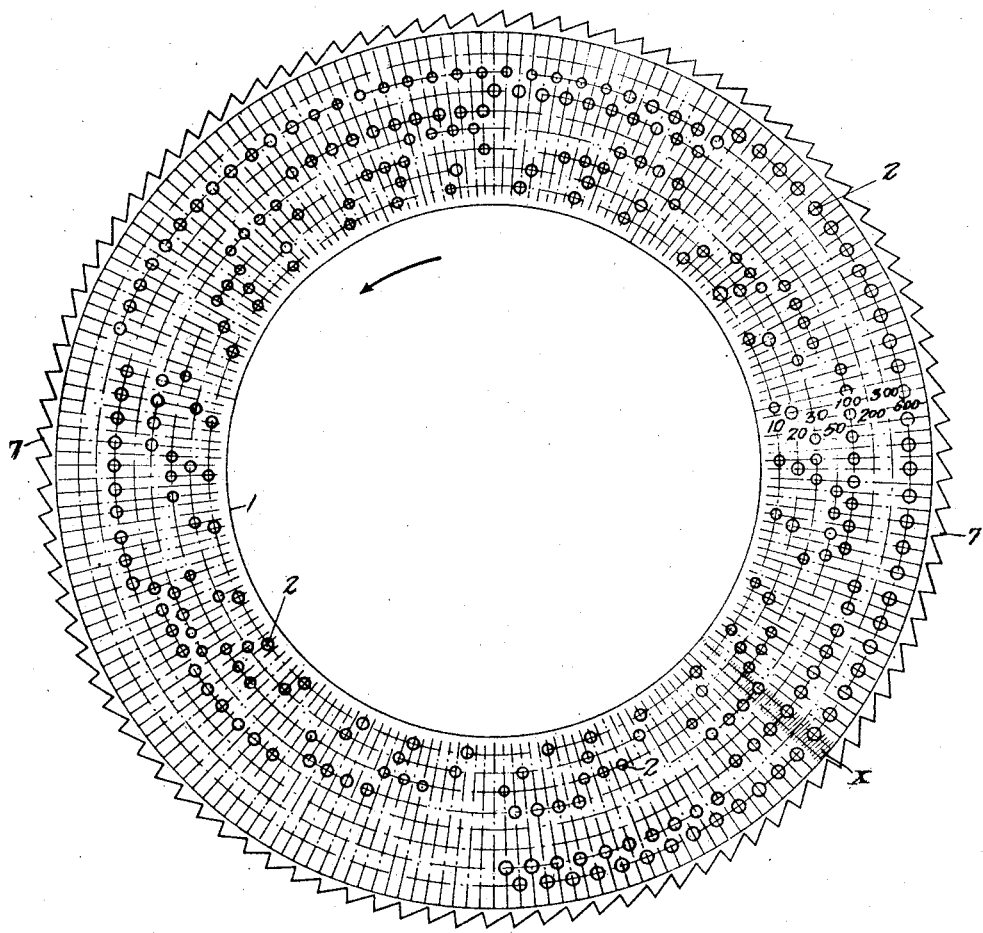
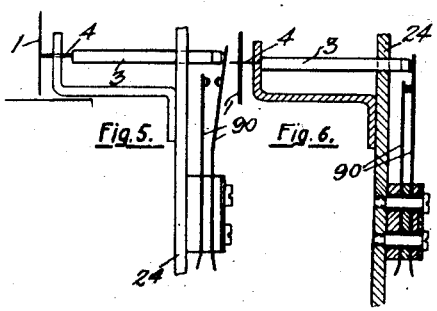
Leon de Brouckere INVENTOR
per ATTORNEY.

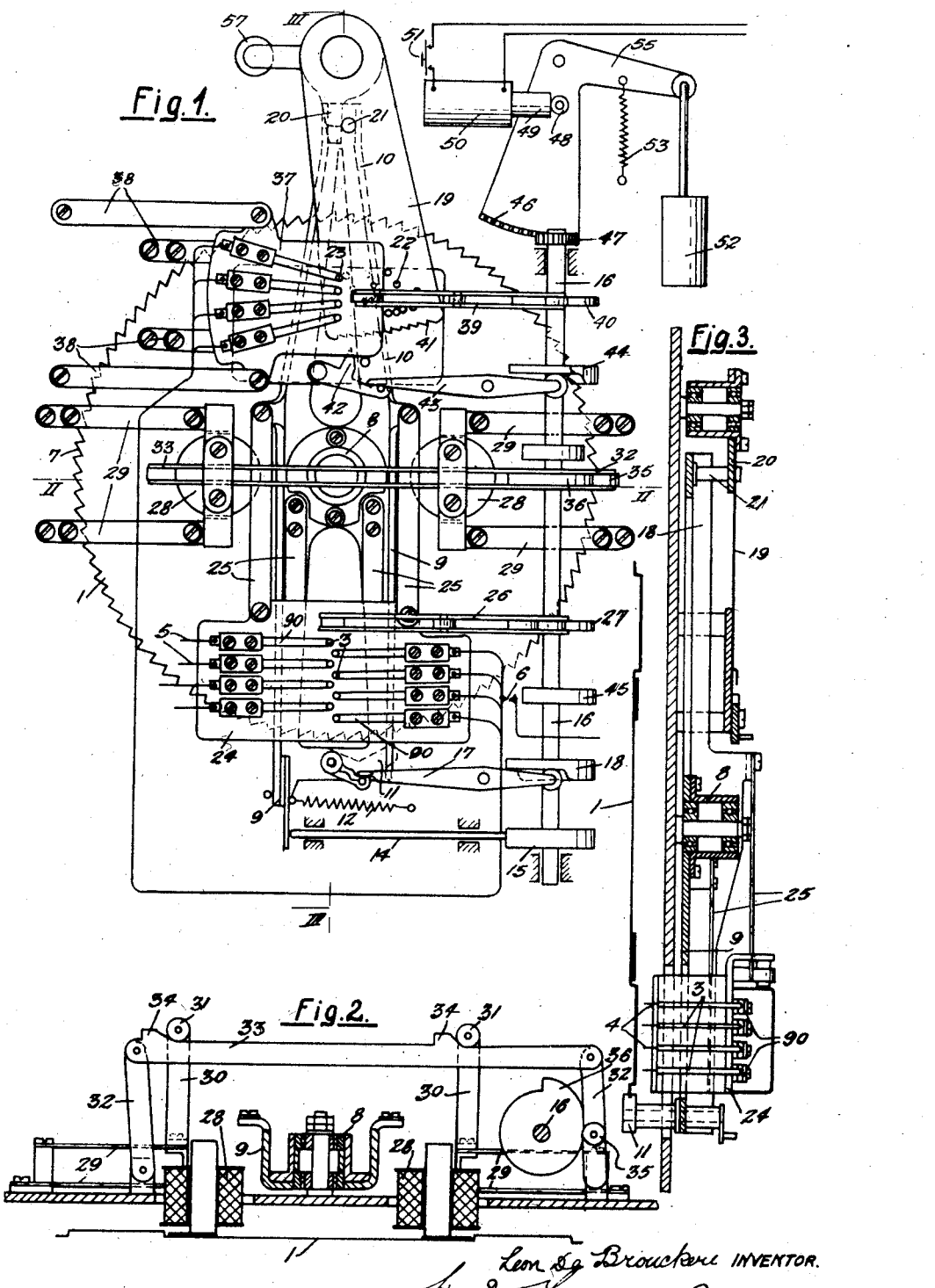

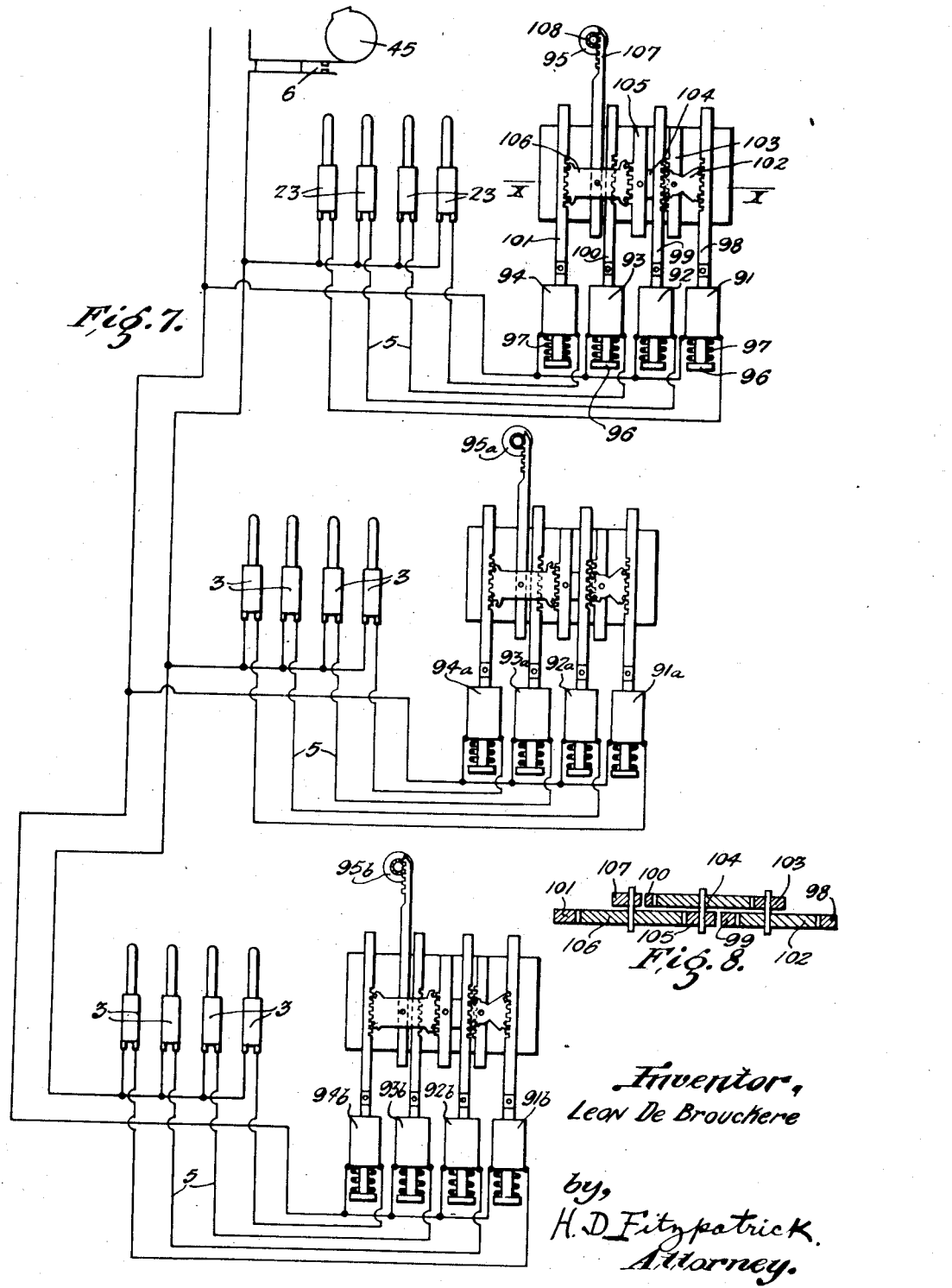

Patented Sept. 10, 1940

2,214,720

UNITED STATES PATENT OFFICE 2,214,720

RECORDING MEANS FOR WEIGHING MACHINES

Léon de Brouckere, Brussels, Belgium

Application March 28, 1938, Serial No. 198,573
In Germany June 29, 1937

7 Claims. (Cl. 234—5.4)

The invention relates to apparatus for "transmitting" the weight indications of a weighing scale to an indicating and/or recording or printing apparatus, of the kind having a measuring element which has holes, slots or the like numeral-representing means and which is relatively adjustable with reference to feelers (mentioned below) in accordance with the indication of the weighing scale, and feelers adapted to investigate said numeral-representing means and to control, in accordance with the investigation, means for transmitting to the indicating and/or recording or printing apparatus the appropriate higher numerical values of the weight indication.

In such apparatus with so-called "electrical transmission" of the higher numerical values of the weight indication, for example, in a weighing scale with kilogramme divisions, the transmission of the tens and the multiples thereof presents no substantial difficulties but it is otherwise with the lower numerical values of the weight indication, for example, the units. Here the holed part of the measuring element, such as a so-called "transmitting disc" adjusted by an indicating control shaft, would be too small for the holes corresponding to the different unit numbers and the co-operating feelers to be applied. Therefore, for the registration of unit numbers, it has been arranged that the weight indication of the weighing apparatus exceeding the complete tens number is measured by a measuring feeler, which may be a pawl, co-operating with teeth on the transmitting disc, the movement of the measuring feeler being transmitted electrically to the indicating, registering or printing apparatus. For this purpose, the movement of the measuring feeler is transmitted through a worm wheel and a worm shaft, the worm shaft at the same time driving a torque current generator connected by corresponding conductors with a synchronous motor built in the indicating, registering or printing apparatus. This motor, in turn, drives through a worm gear, the parts of the apparatus to be further controlled or adjusted.

This known apparatus is comparatively expensive; further, it is unreliable and it is also not applicable for all cases.

The present invention solves the problem of transmitting the smaller numerical values of the weight indication to the indicating, recording or printing apparatus, by the use, in a new way, of a measuring feeler (known per se) for the smaller numbers.

The object of the invention is to effect the transmission of the indications of the smaller numerical values in the same way as those of the larger numerical values.

In accordance with this invention the weighing apparatus is characterised by a main measuring apparatus and an auxiliary measuring element which latter is provided with holes, slots or the like numeral representing means and by feelers adapted to investigate said numeral representing means and to control in accordance with the investigation the movements for transmitting the lower numerical weight values to the indicating and/or recording or printing apparatus, and by means for limiting the movement of the auxiliary measuring element correspondingly to the amount by which the value given by the main measuring element differs from the actual weight of the article or substance being weighed.

The limiting means aforesaid comprises abutments, for example teeth, on the main measuring element and a relatively movable measuring feeler (for example a pawl) which is carried by movable parts in operative connection with the auxiliary measuring element.

The new apparatus is particularly distinguished from known apparati by greater simplicity and cheapness of construction, and by greater reliability in the transmission of the smaller weight values.

In order that the invention may be clearly understood we have hereunto appended drawings which show a weighing scale provided with electrical transmission means this being given merely by way of example.

In the example of weighing apparatus shown in the drawings:

Fig. 1 is an elevation from the rear of the weighing apparatus of the parts essential to the invention.

Fig. 2 is a horizontal section on the line II—II in Fig. 1.

Fig. 3 is a vertical section on the line III—III of Fig. 1.

Fig. 4 is an elevation of the so-called transmitting disc drawn as a diagram to an enlarged scale compared with the other figures.

Figs. 5 and 6 show a detail, namely a feeler and a switch in side view and in section.

In Figs. 7 and 8 there is shown a specially advantageous example of the application of control apparatus in conjunction with the new transmitting apparatus on the weighing scale to a printing device.

Fig. 7 is a diagrammatic illustration in which all parts are shown in one plane and Fig. 8 is a section on the lines X—X, Fig. 7.

On the indicator shaft (not shown) of the weighing scale, for example a known pendulum weighing scale, there is a circular disc 1 of soft iron, which is the so-called transmitting disc. This is provided with several rows of holes 2 arranged in concentric circles, the holes in the different rows corresponding to different numerical values. In the drawings, it being assumed that the weighing scale has a capacity of one thousand kilogrammes, eight circular rows of holes are indicated (only part shown at Fig. 4) by way of example. Two rows of feelers 3 arranged radially of the disc co-operate with the apertured disc 1 and when they are moved against the disc their points 4 either encounter apertured or unapertured parts of the disc 1. A small electric switch, which is normally closed, is connected with each feeler 3.

As shown by way of example in Figs. 5 and 6, the switches may each consist of two leaf springs 90 provided with contact projections, the projections normally being pressed against each other. At the free end of the somewhat longer leaf spring lies a bolt 3 perpendicularly guided with reference to the transmitting disc 1 and which constitutes the feeler. The end of the bolt 3 next to the disc 1 is of smaller diameter and thus constitutes a thin point 4 suitable for engaging in the holes 2. The feeler 3 is pressed forward by the leaf spring until its shoulder engages on the guide for the thin bolt end 4.

If a feeler engages with its end 4 on an unapertured part of the disc 1, it is held back and therefore the switch connected therewith is opened (Fig. 5). Those feelers which encounter holes remain undisturbed so that their switches remain closed (Fig. 6). The apparatus for moving the feelers against the transmitting disc 1 will be described later. Conductors 5 lead from the feelers 3 to the recording or printing apparatus which is electrically controlled from the weighing scale and lead, for example, to control magnets arranged in these apparati, which magnets control the adding discs, type wheels or similar elements of the recording or printing apparatus directly or indirectly through control rods or so-called keys in accordance with the numerical values of the holes with which the feelers for the time being have engaged. The excitation of these magnets is effected by closing a common switch 6 after the switches 90 have been set so far as is necessary by the movement of the feelers 3 against the transmitting disc 1.

The apertured part of the transmitting disc and the feelers co-operating therewith serve to transmit the tens and hundreds of the load, for the time being on the weighing scale, to the recording or printing apparatus.

The main transmitting disc is provided at its edge with one-sided, wedge-shaped teeth, that is, ratchet teeth or circular saw-like teeth 7, the pitch of which is equal to an angular turning of the disc 1 corresponding to a weight of ten kilogrammes. With a weighing range of 1000 kilogrammes the number of teeth is $\frac{1}{10}$ of a thousand, that is 100. A measuring apparatus for the reading above a complete ten which may happen to occur co-operates with the teeth 7 of the transmitting disc. This measuring apparatus is as follows. Co-axial with the transmitting disc 1, a double armed lever 9, 10 of U-formed cross section is turnably mounted by means of journals engaging in a bearing 8, the lower part 9 of the double armed lever carrying a feeler in the form of a turnable pawl 11 suitable for engagement in the teeth of the transmitting disc. The lever 9, 10 is under control of a spring 12 which tends to move it in the opposite direction to the rotation of the transmitting disc 1 which occurs on weighing (that is, anti-clockwise in Fig. 1). The pawl 11 is loaded by means of a spring (not shown) which seeks to move it into engagement with the teeth of the disc 1. The double armed lever 9, 10 is normally held in the position of rest shown in Fig. 1 by a push rod 14 acted on at its one end by means of a cam disc 15 located on a control shaft 16, while the pawl 11 is normally held out of engagement with the teeth of the transmitting disc 1, by a spring retracted double-armed lever 17 operable by a lifting cam 18. On part rotation of the control shaft 16 the cam 18 first frees the pawl 11 and then the cam 15 the double armed lever 9, 10 with the result that the pawl 11 engages in the interdental space of the transmitting disc 1 which happens to lie opposite and then moves as a result of the partial rotation of lever 9, 10 by the spring 12 until it engages on the steep face of the neighbouring tooth. The partial rotation of the lever 9, 10 which corresponds to the reading of the scale above a full ten number is transmitted in magnified form to a second or auxiliary, sector-shaped transmitting device 19. This transmitting device 19 is turnably mounted above the transmitting disc 1 and has a projection 20 which engages a projection 21 on the double armed lever 9, 10. By means of this projection the sector is rotated against a returning means, for example a counterweight 57, which tends to return it into the zero position or the position of rest, through an amount in clockwise direction corresponding to the rotation of the lever 9, 10. The auxiliary transmitting sector 19 is provided with several rows of holes 22, similarly to the transmitting disc 1, the holes in the different rows representing different numerical values. The number of rows of holes is smaller than in the transmitting disc 1. There are, for example, only four. Four feelers 23 similar to the feelers 3 co-operate with the transmitting sector 19, and can be moved against the sector so that in accordance with the position thereof one or several feelers enter the holes 22 and are not disturbed, while others engage on the disc 19 and so prepare the small switches of the electric circuits which thereafter can be closed by the already mentioned common switch 6. Further conductors lead from the feelers 23 to the recording or printing apparatus, that is, to the control magnets provided in this case.

The transmitting sector 19 and the feelers 23 arranged therewith serve to translate the unit numbers of the weight indicated by the weighing apparatus to the recording or printing apparatus so that with the aid of the apparatus described the weight can be communicated to the recording or printing apparatus exact to one kilogramme.

The feelers co-operating with the transmitting disc 1 are fixed to a plate 24 which is carried by the arm 9 of the double-armed swinging lever 9, 10. Thus these feelers take part in the turning of the swinging lever 9, 10 which takes place on measuring that part of the weighing scale indication which exceeds a complete ten, the result being that both rows of feelers 3 are always adjusted exactly with reference to those holes in the transmitting disc 1 which correspond to the next lowest complete ten number of the weight indicated by the weighing scale. The plate 24 carrying the feelers 3 is so movably connected with the lever 9, 10 that it can be moved transverse to the swinging plane of this lever and therefore vertically with reference to the transmitting disc 1. To this end the plate is attached at one end by pairs of leaf springs 25 (Figs. 1 and 3) whose other ends are attached to the swinging lever 9, 10. The spring of each pair of leaf springs 25 located next to the transmitting disc 1 is of somewhat greater length than the spring located away from the transmitting disc. Both springs of each pair of leaf springs 25 are so arranged to each other that they constitute a parallel link guide (compare the leaf spring pairs 29 carrying the other part in Fig. 2). The movement of the plate 24 with the feelers 3 against the disc 1 is effected through a double armed lever 26 by a cam disc 27 on the control shaft 16.

During the feeling operation the transmitting disc 1 is securely held against rotation. For this purpose there are provided two holding magnets 28 whose iron cores are each arranged with an end opposite the disc 1. The magnets 28 are attached to a fixed wall by means of leaf spring pairs 29 which, similarly to the leaf springs 25 carrying the plate 24 with the feelers 3, constitute parallel link guides, so that they can be moved against and away from the disc 1. Before the feeling operation on the transmitting disc they are guided to the latter (without exercising any appreciable pressure on the disc) and are then energised by closing a switch which is not shown and on being energised the magnets, in known manner, magnetically engage the disc. The movement of the magnets 28 against the disc 1 is permitted by the leaf springs 29 carrying them. Their removal from the disc, on the switch being opened, is effected by the aid of two pull rods 30 which engage by means of rollers 31 with a rod 33, guided with parallel motion by two links 32 and on which rod there are two cam projections 34. The cam rod 33 is under the influence of a spring (not shown) which tends to move it towards the left and can be moved towards the right by a cam disc 36 co-operating with a roller 35 on the right hand link 32. Normally the rod 33 is in its right hand position so that the magnets 28 are away from the disc 1. On the control shaft 16 commencing to rotate the cam disc 36 frees the rod 33 which is moved towards the left and therefore permits the movement of the magnets 28 against the disc 1 (Fig. 2).

The feelers 23 co-operating with the transmitting sector 19 are similarly attached to a plate 37 which similarly to the plate 24 is carried by leaf spring pairs 38 constituting a parallel motion guide and which are attached to a fixed wall. Movement of the plate 37 with the feelers 23 against the transmitting sector 19 is effected through a double armed lever 39 by means of a cam disc 40 on the control shaft 16. In order to ensure correct operation of the feelers 23 with the sector 19, the latter has always to be adjusted exactly to a unit division before the feeling operation. For this purpose the outer edge of the sector is provided with a number of teeth corresponding to the number of divisions. Thus, for example, it is provided with 10 teeth 41. A pawl 42 co-operates with these teeth, being pivotally attached to a fixed wall and being under the influence of an inserting spring, which is not shown, and being normally held in withdrawn position by a spring retracted double armed lever 43 operable by cam 44 on the control shaft 16. After the sector 19 has been adjusted the pawl 42 is released by movement of the lever 43 by the control cam 44 so that the pawl moves under its spring action into the interdental space, of the sector 19, which happens to be opposite. Thereupon, by means of its pressure on the sloped rear face of the engaged tooth 41 the pawl effects a small movement of the sector until the steep face of the neighbouring tooth engages with the pawl. Thus the sector is so adjusted that the holes 22 of the sector 19 which are to be engaged lie exactly beneath the feelers 23. The pawl 42 then holds the sector firmly in this position. As will be apparent the adjustment of the sector 19 is also equivalent to a simultaneous rounding off of the unit kilogrammes to a full number.

The control shaft 16 carries, besides the already mentioned cam discs and cams 15, 18, 27, 36, 44 and 40, still a further cam disc 45 for operating the common switch 6 which closes the circuits set by the feelers 3 and 23 for controlling or adjusting the indicating, recording or printing apparatus. A tooth sector 46 in the form of a bell crank lever is provided for driving the control shaft 16, a toothed wheel 47 at the upper end of the shaft 16 engaging the toothed sector. The toothed sector 46 carries a roller 48 against which the armature 49 of an electromagnet 50 engages. The magnet 50 can be energised by a hand switch 51 which advantageously is formed as an automatic self-opening press button switch. The armature 49 of the magnet 50 which then moves turns the sector 46 by its pressure on the roller 48 so that the control shaft 16 is turned. When the magnet is de-energised by the release of the switch 51 the toothed sector returns under the influence of a spring 53 (which may be replaced by a weight) engaging on its laterally projecting arm 55 into its position of rest and thereby also rotates the control shaft 16 back to its initial position. In order to damp the control movement an oil or air brake 52 can be provided.

The modus operandi of the apparatus is as follows:

After the weighing scale has operated and the transmitting disc 1 moved in accordance with the weight of the object being weighed has come to rest, the magnet 50 is put into circuit by operation of the hand switch 51 with the result that the armature 49 moves the control shaft 16 by partial rotation. First, as a result of this rotation, the cam 36 releases the holding magnets 28 which move towards the transmitting disc 1. At the same time the magnets 28 are energised by a switch, not shown, which likewise can be controlled from the cam disc 36, so that the transmitting disc is locked in position. Then the cam 18 frees the feeler pawl 11 and the cam disc 15 frees the double armed oscillating lever 9, 10 with the result that the pawl 11 enters the opposite interdental space of the transmitting disc 1 and then the oscillating lever 9, 10 turns in anti-clockwise direction until the pawl 11 lies against the steep face of the neighbouring tooth. The sector-shaped auxiliary transmitter 19 is moved by the rotation of the oscillating lever 9, 10 in accordance with the units of weight measured by the pawl 11. Then the cam 44 frees the pawl 42 which now enters the opposite interdental space of the transmitting sector 19 under the influence of its spring and corrects and holds the sector. When this has occurred the plate 24 with the feelers 3 and the plate 37 with the feelers 23 are pressed against the transmitting disc 1 and the opposite sector 19 by means of levers 26 and 39 by means of the two cam discs 27 and 40 with the result that the feelers investigate the parts of both transmitters which were moved opposite them and operate the corresponding switchs connected therewith, and thus, for example, open certain of them while others remain closed. In this way the electrical circuits for operating or setting the recording or printing apparatus are prepared in accordance with the weight weighed by the weighing apparatus and indicated by the transmitting disc 1 and transmitting sector 19. Now the common switch 6 is closed by the cam disc 45 through which switch the total control current for the recording or printing apparatus passes. Thus the control circuits are closed so that the operation or setting of the recording or printing apparatus to the actual weight indicated by the weighing apparatus takes place. When the operation or the setting is completed the magnet 50 is de-energised and the control shaft 16 then turns back to its initial position whereupon all the parts moved and controlled by this shaft likewise return to their initial or rest position.

The example shown can, of course, be structurally altered in many ways, thus the control of the switches connected with the feelers 3 and 23 may be such that normally open switches are closed by the movement of the feelers against the transmitting disc 1 and the transmitting sector 19. Further the common switch 6 can be obviated if the switches connected with the feelers 3 and 23 directly close the control circuits instead of merely setting them. The teeth 41 on the transmitting sector 19 instead of being wedge shaped on one side may be of double wedge shape. The guiding of the holding magnets 28 and the plates 24 and 37 carrying the feelers 3 and 23 can be effected by any other suitable means in place of the link-like leaf springs. The control shaft 16 could be rotated in another manner, for example by hand, instead of by a push magnet.

The apparatus controlled by the new arrangement electrically from the weighing apparatus can, if desired, be a registering or adding apparatus, a printing apparatus and, in certain cases, also an indicating apparatus located apart from the weighing apparatus.

In Fig. 7 the numerals 3 denote the eight feelers which have already been described with reference to Figs. 1 to 6 and which co-operate with the transmitting disc 1 and the numerals 23 likewise denote the four feelers already described with reference to Figs. 1 to 6 which co-operate with the transmitting sector 19. 6 is the common switch operated by the cam disc 45 on the control shaft 16 and which closes simultaneously the control circuits set by the feelers 23 and 3.

As already mentioned the transmitting disc 1 (Fig. 4) has eight circular rows of holes 2. Of these rows of holes and the co-operating feelers 3, four rows, that is the four inner rows, serve for transmitting the tens order of the weight indication while the four outer rows serve for transmitting the hundreds order of the weight indication. As also already mentioned the transmitting sector 19 has four rows of holes which serve in conjunction with four feelers 23 for transmitting the unit numbers of the weight indication. Thus, for each weight digit there are provided four rows of holes and four feelers. The holes of each row of holes and the corresponding feelers have a definite numerical value. The proportion of these values to each other is equal, in the units, the tens and the hundreds. Thus the first row of holes for the units have the value 1, the second row the value 2, the third row the value 3 and the fourth row the value 6. Similarly the values in the rows for the tens are 10, 20, 30 and 60 and in the rows for the hundreds are 100, 200, 300 and 600 (see the numerals applied to the rows of holes at the right-hand side of Fig. 4). The numerical values of the holes in the part of the transmitting disc 1 and the transmitting sector 19 about to be investigated add together to give the units, tens and hundreds indicated by the weighing apparatus. For example, if the strip X indicated by hatching in Fig. 4 is located at the investigating position then the following holes co-operate with the feelers 3. A hole in the fourth row of the tens (equal to 60), a hole in the second row of the hundreds (equal to 200) and a hole in the fourth row of the hundreds (equal to 600). Thus the switches at the corresponding feelers 3 remain closed so that the sum of the numerical values of these holes, that is, 25 feelers (namely the number 860) is transmitted to the printing apparatus. The same is the case with the transmitting disc 19. If a hole in the third row (numerical value 3) is located at the investigating position, then the switch of the third feeler remains closed and the unit numeral 3 is transmitted which together with the above mentioned numerals on the transmitting disc 1 gives the total sum of 863 kilogrammes.

The feeling switches 3 and 23 are connected by the electrical conductors 5 each with an electrical push magnet 91, 92, 93, 94 or 91a, 92a, 93a and 94a or 91b, 92b, 93b, 94b provided on the printing apparatus. These magnets are, like the feelers, arranged in three groups each consisting of four magnets, and each magnet in the group has a definite numerical value which corresponds to the numerical value of the row of holes with which the feeler connected to it pertains. Thus the magnets 91, 92, 93 and 94 in the uppermost group in Fig. 7 have the numerical values 1, 2, 3 and 6, the corresponding magnets in the middle group have the numerical values 10, 20, 30 and 60 and finally in the lowermost group have the numerical values 100, 200, 300 and 600. Each group of magnets serves to set a definite type wheel 95, 95a, 95b for printing the weight indicated by the weighing apparatus. For the purpose of clearness, the three type wheels of the pertaining magnets are shown spaced from each other in Fig. 7. In practice the three type wheels 95, 95a, 95b are located beside each other on one axis so that the adjusted type thereon can be printed in the form of a compound number on a card or the like. Correspondingly the three groups of magnets are in practice arranged directly beside each other. The drives which on actuation of the electro-magnets adjust the type wheels are formed as triple differential drives. They are the same in all three magnet groups so that it is sufficient to describe one of these drives for example that of the magnet group for the units.

Each magnet 91, 92, 93, 94 has a vertical guided iron core or armature 96 which is drawn upwards on excitation of the magnet 1 but which is usually held in the lower position by a retracting spring 97. At the upper end of each magnet core 96, there is attached a vertical rack 98, 99, 100 and 101. The magnet cores and the racks of all four magnets have the same stroke which is accurately limited by projections not shown. The racks 98, 99 of the two magnets 91 and 92 corresponding to the numerical values 1 and 2 engage at opposite sides of a wheel 102 provided with two toothed curves of different radii (the wheel 102 can also be called a double armed lever). The said wheel is mounted on a vertically movably guided rack 103. The radius of curvature of the toothed curve of the toothed wheel 102 engaging with the rack 98 is double the radius of curvature of the curve engaging with the rack 99. The rack 103 carrying the wheel 102 engages on one side in a second wheel 104 (or lever) provided with two toothed curves, which is mounted on a vertically movably guided rack 105. On the other side of this wheel engages the rack 100 of the electro-magnet 93. Both toothed curves of the wheel 104 have the same radius of curvature. The rack 105 carrying the wheel 104 engages in turn at one side of a wheel 106 (or lever) having two toothed curves which is mounted on a rack 107. On the other side the rack 101 of electro-magnet 94 engages with this wheel. The radii of curvature of both toothed curves of the wheel 106 are equal. The rack 107 carrying the wheel 106 engages with a pinion 108 which is fixed to the type wheel 95 so that the latter shares the rotation of the pinion 108.

If all four electro-magnets 91—94 are energised at once and thus all four racks 98—101 of the magnets raised simultaneously, the following occurs. Both racks 98, 99 lift the wheel 102 without rotating it, whereupon the rack 103 carrying the wheel is moved upwards the full stroke of the magnets (the length of this stroke is denoted by L). As the rack 100 of magnet 93 is simultaneously moved upwards the wheel 104 is raised by the two racks 103 and 100 without being rotated so that the rack 105 carrying the wheel 104 is also moved upwards through the stroke L. This rack and the simultaneously upwardly moved rack 101 of magnet 94 finally raise the wheel 106 (again without rotation) so that the rack 107 is also raised through the stroke L. This rack thereupon rotates the type wheel 95 through an angle corresponding to the full stroke L which is denoted by $a$. This angle of rotation $a$ corresponds to a rotation of the type wheel through 12 divisions or spaces. In practice all four electro-magnets 91—94 are never energized at once. The explanation of simultaneous actuation of all four magnets is only to help understanding of the following cases which occur in practice.

If the electro-magnet 94 only is energized as when the number 6 is to be transmitted from the weighing apparatus to the type wheel, then only the rack 101 moves upwards with the result that wheel 106 by rolling the stationary rack 105 is rotated. The rack 107 carrying the wheel is, on account of the equal lengths of the lever arms of the wheel 106, moved through the half stroke of the rack 101, that is, upwards through a stroke $$\frac{L}{2}$$

It thus rotates the type wheel through the angle $$\frac{a}{2}$$

that is through six divisions or type spaces, whereupon the type wheel 95 is rotated from the zero position into that position in which the number 6 is located at the printing position.

On excitation of the magnet 93 and upward movement only of the rack 100 the following takes place; the rack 100 rotates the wheel 104 which rolls on the stationary rack 103, whereupon, on account of the equal radii of both toothed curves, the rack 105 is moved through the stroke $$\frac{L}{2}$$

the rack 105 in turn rotates the wheel 106 which rolls on the rack 101, whereupon the stroke of the rack 105, reduced by a half, is transmitted to the rack 107 whose upward movement is thus equal $$\frac{L}{4}$$

The toothed rod 107 thus rotates the type wheel 95 through the angle $$\frac{a}{4}$$

that is, through three divisions, so that the number 3 is set up.

On excitation of magnet 92 and upward movement only of the rack 99 the following takes place; the rod 99 rotates the wheel 102 which rolls on the rack 98, whereupon, owing to the ratio 3:2 given by this wheel, the rack 103 carrying the wheel 102 is moved upwards an amount which is equal to $$\frac{2L}{3}$$

The rack 103 rotates the wheel 104 which rolls on the rod 100 so that the upward movement of the rod 103, reduced by a half, is transmitted to the rack 105 which is thus moved upwards by the stroke $$\frac{2L}{6}$$

This rod in its turn turns the wheel 106 which rolls on the rack 101 whereupon its movement, again reduced by a half, is transmitted to the rack 107. The rack 107 thus executes a stroke of $$\frac{2L}{12}$$

or $$\frac{L}{6}$$

Consequently the type wheel is turned through the angle $$\frac{a}{6}$$

that is, through two divisions and the number 2 is thus set up.

If the magnet 91 is energised and only the rack 98 moved upwards then the latter rotates the wheel 102 rolling on the rack 99 with the result that, on account of the present transmission ratio of 3:1, the rack 103 is moved upwards through the stroke $$\frac{L}{3}$$

This movement of the rod 103 is in the manner described above transmitted through the wheel 104, rack 105 and wheel 106, reduced twice by half, to the rack 107 which thus executes a stroke of $$\frac{L}{12}$$

The type wheel 95 is therefore rotated through the angle $$\frac{a}{12}$$

that is through one division so that the numeral 1 is set up.

With simultaneous excitation of several magnets (in practice normally only the simultaneous excitation of two magnets of the same group comes into consideration) the angular rotations of the type wheel arising out of the upwards movements of the racks of the excited magnets are added together. Thus with simultaneous excitation of magnets 91 and 93 the number 4 is set up by type wheel 95, by excitation of the magnets 92 and 93 the number 5, by simultaneous excitation of the magnets 91 and 94 the numer 7, by excitation of the magnets 92 and 94 the number 8 and by excitation of the magnets 93 and 94 the number 9. Thus by excitation of a corresponding single magnet or two magnets together giving the desired numerical value all numbers from 1 to 9 can be set up.

The method of operation of the differential drives in both other groups of magnets B and C is exactly the same as above described. The only difference is that the numbers on the type wheels 95a and 95b are ten times or a hundred times greater than the value of the number set up on the type wheel 95, because these two wheels represent the tens and hundreds.

If the weighing scale indicates, as already mentioned in explaining the significance of the rows of hols on the transmitting disc 1 and the transmitting sector 19, a weight of 863 kilogrammes then on investigation of the transmitting disc 1 and the transmitting sector 19 by the feelers 3 and 23 and on the thereupon occurring closing of the common switch 6, the following magnets will be energised. In the hundreds group the magnets 94b and 92b corresponding to the numerical values 600 and 200, in the tens group the magnet 94a corresponding to the numerical value 60, and in the unit group the magnet 93 corresponding to the numerical value 3. Correspondingly, on the type wheel 95b for the hundreds, the printing numeral 8 will be set up, on the printing wheel 95a for the tens, the printing numeral 6 will be set up and finally the printing numeral 3 on the type wheel 95 for the units, so that the entire number 863 is set up at the printing position. The printing of the type set up on to a register strip, a weighing card or the like may be effected in any known way, for example, by pressing the paper strip or the card with an interposed colour band or the like by means of a movable pressing plate against the type. When the printing apparatus has operated the circuit of the electro-magnet 50 driving the control shaft 16 (Fig. 1) may be opened so that the control shaft 16 returns to its initial position. Thereupon all control circuits are again opened by the common switch 6. The magnets in the printing apparatus are all de-energised with the result that the displaced magnet cores 96 return to the lower terminal position under the influence of their retracting springs. They take the racks 98—101 with them which, in turn, retract the transmission levers 102, 104, 106 and the racks 103, 105 and finally also the rack 107 into their initial position, so that the type wheels 95, 95a, 95b are all returned together to zero.

The apparatus described with reference to Figs. 7 and 8 can also be used when the apparatus which is electrically controlled from the weighing apparatus is not a printing apparatus but merely an indicating apparatus. In this case the wheels or discs 95, 95a, 95b rotated by the racks 107 are indicating discs provided with simple numerals.

As is apparent the apparatus according to Figs. 7 and 8 has the advantage that for the transmission of a weight unit occurring in each of ten different numbers, only four control circuits and consequently only four feeler switches on the weighing scale and four push magnets on the printing, indicating or adding apparatus are necessary. Further the differential drive which serves to transmit the thrust of the electromagnet with a transmission ratio corresponding to the numerical value of the magnets on to the racks for the type wheels or the like is comparatively simple and it operates exactly and reliably.

Throughout the specification I have referred to indicating and/or recording or printing apparatus but in the annexed claims I have used in lieu thereof the term "exhibiting apparatus" as being a generic term covering indicating, recording or printing apparatus generally.

What I claim is:

1. In a weighing machine giving weight indications including units and multiples thereof, apparatus for electrically transmitting the multiples to an exhibiting apparatus comprising an angularly movable measuring element connected to the weighing mechanism, spaced multiple-representing means on said element, a plurality of feelers for investigating said means and mounted on a movable carrier, movable electro-magnetic means for engaging and holding said element in position, electrical exhibiting apparatus-operating circuits controlled by said feelers and teeth on the measuring element spaced apart a distance corresponding to the lowest multiple of units, an angularly movable auxiliary measuring element, spaced unit-representing means thereon, a plurality of feelers for investigating said last mentioned means and mounted on a movable carrier, a pivoted lever, a measuring pawl on said lever adapted to engage said teeth, and an abutment on said lever engaging said auxiliary measuring element so as to transmit the movement of the measuring pawl in magnified form to said auxiliary measuring element, teeth on said last-mentioned element and pawl means for engaging said teeth to correct the position of said auxiliary measuring element, a common switch for all said circuits and common control means for causing said electro-magnetic means to engage the measuring element, for causing the lever to move until the measuring pawl engages a tooth on the measuring element, moving the carriers to cause the feelers to investigate the multiple and unit-representing means, causing the pawl means to engage the teeth on said auxiliary measuring element and correct the position of same and causing closure of said common switch.

2. An apparatus for transmitting the indications of a weighing machine to an exhibiting apparatus, the transmitting apparatus comprising a main measuring element for numerals of higher order, said element being movable in a weight-responsive manner and provided with numeral-representing means, feelers to investigate said means and in accordance with the investigation to control movements for exhibiting numerals of higher order, abutments on said main measuring element spaced apart by distances each representing the unit numeral of higher order, a movable structure supporting said feelers, a detent movable with said structure and engageable with said abutments, an auxiliary measuring element for numerals of lower order and provided with numeral representing means, feelers to investigate said latter means and in accordance with the investigation to control movements for exhibiting numerals of lower order, a mechanical movement transmitting connection between said movable structure and said auxiliary measuring element, and means for moving said movable structure as allowed by said spaced abutments and said detent, whereby a movement is transmitted to the auxiliary measuring element which is representative of the amount by which the exhibited numerals of higher order differs from the actual weight of the commodity being weighed.

3. An apparatus for transmitting the indications of a weighing machine to an exhibiting apparatus, the transmitting apparatus comprising a main measuring element for numerals of higher order, said element being movable in a weight-responsive manner and provided with numeral-representing means, feelers to investigate said means and in accordance with the investigation to control movements for exhibiting numerals of higher order, abutments on said main measuring element spaced apart by distances each representing the unit numeral of higher order, a movable structure supporting said feelers, a detent movable with said structure and engageable with said abutments, an auxiliary measuring element for numerals of lower order and provided with numeral representing means, feelers to investigate said latter means and in accordance with the investigation to control movements for exhibiting numerals of lower order, a mechanical and magnifying movement-transmitting connection, allowing lost motion, between said movable structure and said auxiliary measuring element, resilient means resisting said lost motion, means for moving said movable structure as allowed by said spaced abutments and said detent, whereby a movement is transmitted to the auxiliary measuring element which is representative of the amount by which exhibited numerals of higher order differs from the actual weight of the commodity being weighed, and means to move said auxiliary element independently of said main measuring element by virtue of the allowance of lost motion, and abutment means to limit such independent movement to the amount by which the movement transmitted from the main measuring element differs from the representation of a whole number of units of lower order.

4. An apparatus for transmitting the indications of a weighing machine to an exhibiting apparatus, the transmitting apparatus comprising a main measuring element for numerals of higher order, said element being movable in a weight-responsive manner and provided with numeral representing means, feelers to investigate said means and in accordance with the investigation to control movements for exhibiting numerals of higher order, a lock for the main measuring element, abutments on said main measuring element spaced apart by distances each representing the unit numeral of higher order, a lever supporting said feelers, a detent on said lever engageable with said abutments, an auxiliary measuring element for numerals of lower order constituted by a pivotal structure provided with numeral representing means towards the periphery of said structure and with a movement transmitting connection directly with said lever towards the pivot of said structure, feelers to investigate said latter numeral-representing means and in accordance with the investigation to control movements for exhibiting numerals of lower order, and means for moving said lever as allowed by said spaced abutments and said detent, whereby a movement is transmitted to the auxiliary measuring element which is representative of the amount by which the exhibited numerals of higher order differs from the actual weight of the commodity being weighed.

5. An apparatus for transmitting the indications of a weighing machine to an exhibiting apparatus, the transmitting apparatus comprising a main measuring element for numerals of higher order, the element being constituted as a disc movable in a weight-responsive manner and being provided with numeral representing means, feelers to investigate said means and in accordance with the investigation to control movements for exhibiting numerals of higher order, a lock for said disc, peripheral teeth on said disc spaced apart by distances each corresponding to the unit numeral of higher order, a lever having a fulcrum co-axial with the disc and supporting said feelers, a measuring pawl on said lever on one side of the fulcrum, and engageable with said teeth, an auxiliary measuring element for numerals of lower order constituted by a pivotal structure overlapping said disc but having its pivot without the periphery of said disc and said pivotal structure having numeral-representing means towards its periphery and a movement transmitting connection allowing lost motion and directly connected with said lever on the other side of the lever's fulcrum, resilient means resisting such lost motion, feelers to investigate the latter said numeral-representing means and in accordance with the investigation control movements for exhibiting numerals of lower order, means for moving said lever as allowed by said teeth and said measuring pawl whereby a movement is transmitted to the auxiliary measuring element which is representative of the amount by which the exhibited numerals of higher order differ from the actual weight of the commodity being weighed, means to move said auxiliary measuring element independently of said main measuring element by virtue of the allowance of lost-motion, and abutment means to limit said independent movement to the amount by which the movement transmitted from the main measuring element differs from the representation of a whole number of units of lower order.

6. An apparatus for transmitting the indications of a weighing machine to an exhibiting apparatus, the transmitting apparatus comprising a main measuring element for numerals of higher order, said element being movable in a weight-responsive manner and provided with numeral-representing means, a feeler device to investigate said means and in accordance with the investigation to control movements for exhibiting numerals of higher order, a lock for said main measuring element, abutments on said main measuring element spaced apart by distances each representing the unit numeral of higher order, a movable structure supporting said feeler device, a detent movable with said structure and engageable with said abutments, an auxiliary measuring element for numerals of lower order and provided with numeral representing means, a feeler device to investigate said latter means and in accordance with the investigation to control movements for exhibiting numerals of lower order, a mechanical movement-transmitting connection, allowing lost motion, between said movable structure and said auxiliary measuring element, resilient means resisting said lost motion, means for moving said movable structure as allower by said spaced abutments and said detent, whereby a movement is transmitted to the auxiliary measuring element which is representative of the amount by which the exhibited numerals of higher order differs from the actual weight of the commodity being weighed, means to move said auxiliary measuring element independently of said main measuring element by virtue of the allowance of lost motion, and abutment means to limit such independent movement to the amount by which the movement transmitted from the main measuring element differs from the representation of a whole number of units of lower order.

7. An apparatus for transmitting the indications of a weighing machine to an exhibiting apparatus, the transmitting apparatus comprising a main measuring element for numerals of higher order, the element being constituted as a disc movable in a weight-responsive manner and being provided with numeral representing means, a feeler device to investigate said means and in accordance with the investigation to control movements for exhibiting numerals of higher order, a lock for said disc, peripheral teeth on said disc spaced apart by distances each corresponding to the unit numeral of higher order, a lever having a fulcrum co-axial with the disc and supporting said feelers, a measuring pawl on said lever on one side of said fulcrum and engageable with said teeth, an auxiliary measuring element for numerals of lower order constituted by a pivotal structure overlapping said disc but having its pivot without the periphery of said disc and said pivotal structure having numeral-representing means towards its periphery and a movement transmitting connection directly with said lever on the other side of the lever's fulcrum, a feeler device to investigate the latter said numeral-representing means and in accordance with the investigation control movements for exhibiting numerals of lower order and means for moving said lever as allowed by said teeth and said measuring pawl whereby a movement is transmitted to the auxiliary measuring element which is representative of the amount by which the exhibited numerals of higher order differ from the actual weight of the commodity being weighed.

LÉON DE BROUCKERE.